June 27, 1961   C. F. GROVER ET AL   2,990,203
EXTRUDED CONNECTING TEES FOR SCAFFOLDING
Filed Aug. 3, 1959                                                2 Sheets-Sheet 1
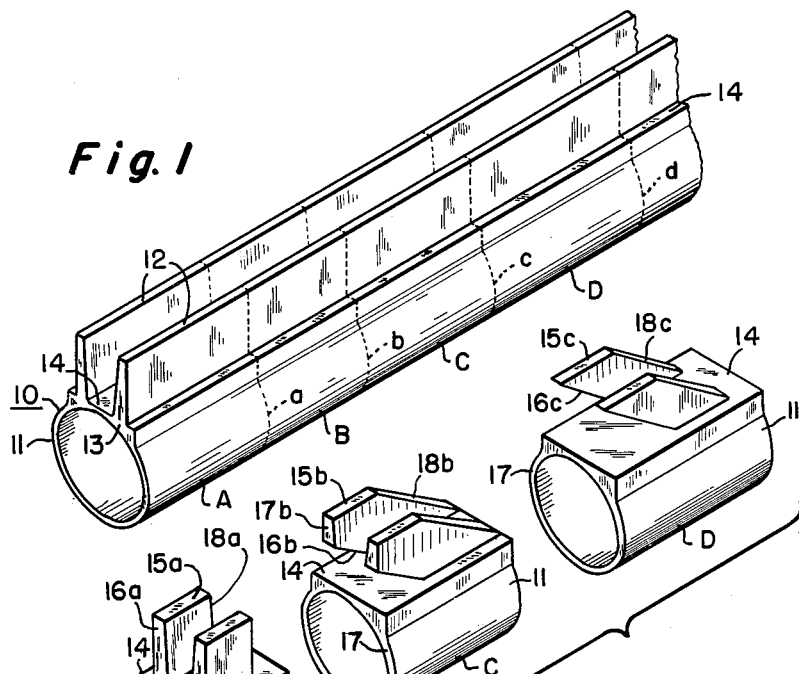
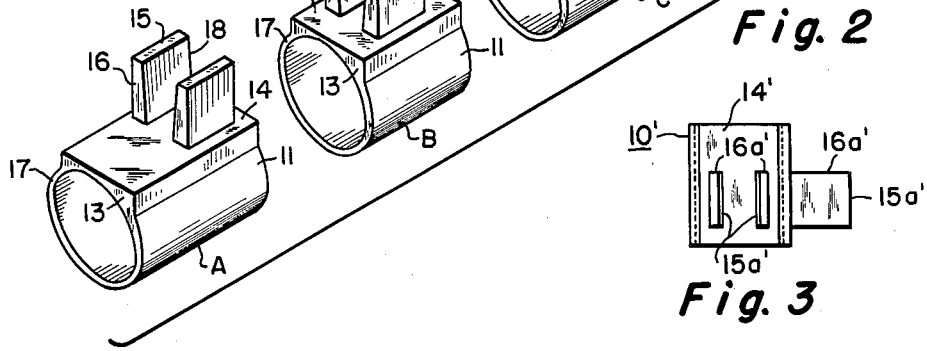
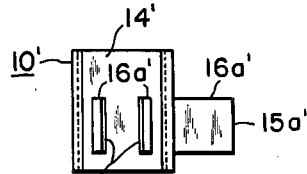
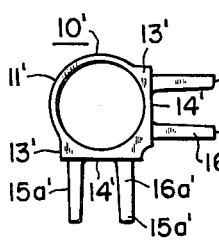
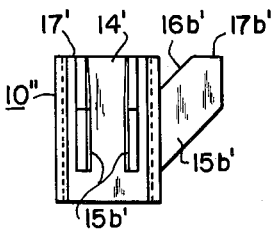
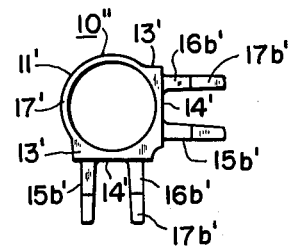
INVENTORS.
Charles F. Grover
John W. Stubert
BY
*Green, McCallister & Miller*
THEIR ATTORNEYS June 27, 1961   C. F. GROVER ET AL   2,990,203
EXTRUDED CONNECTING TEES FOR SCAFFOLDING
Filed Aug. 3, 1959   2 Sheets-Sheet 2

INVENTORS.
Charles F. Grover
John W. Stubert
BY

THEIR ATTORNEYS

United States Patent Office 2,990,203
Patented June 27, 1961

2,990,203
EXTRUDED CONNECTING TEES FOR SCAFFOLDING
Charles F. Grover and John W. Stubert, Greenville, Pa., assignors to R. D. Werner Co., Inc., Greenville, Pa., a corporation of Pennsylvania
Filed Aug. 3, 1959, Ser. No. 831,236
7 Claims. (Cl. 287—54)

This invention relates to T connectors, and more particularly to extruded T connectors with improved structural characteristics and a novel method of forming such T's.

In the past, individual, angularly-intersecting members of a scaffolding frame have been joined together by forming a hole in one such member and by inserting the other member therewithin. The connection is then secured in place either by passing a pin or bolt therethrough, or by forming a bead weld about the intersection of the two members. Other methods of joining scaffolding members together require the use of clamps or hangers. In addition, cast collars are welded on main frame members to provide a thickened portion thereon, and a connecting member is welded directly to the thickened collar portion. Such a latter type of connection, however, is limited to main frames and requires either an expensive and accurate pre-shaping of the end face of the connecting member, or else an excessive amount of weld metal about the joint in order to provide a structurally sound weld between the flat end face of the connecting member and the wall of the cylindrical cast collar.

It thus has been an object of our invention to provide an inexpensive and quick assembly means for forming structurally sound connections between intersecting frame members of scaffolding constructions;

Another object of our invention has been to provide forms of connecting T's which may be simply and economically manufactured for different angular connected arrangements, to facilitate connecting various intersecting frame members of a scaffolding construction;

An aditional object of our invention has been to provide a new and improved method of forming connecting T's of improved structural characteristics;

A further object of our invention has been to provide a new method for joining frame members of a scaffolding construction;

These and other objects of our invention will become apparent to those skilled in the art from the following disclosure and drawings in which:

FIGURE 1 is a perspective view showing a fragment of an elongated extruded member from which various forms or shapes of our T connectors may be formed. The dotted lines in FIGURE 1 illustrate how the elongated member may be cut transversely and divided into segments to produce connectors of various lengths.

FIGURE 2 shows side perspective views illustrating four exemplary forms of connectors which may be produced from the extruded member of FIGURE 1;

FIGURES 3 and 5 are side elevational views of other forms of connectors which may be formed from an elongated member having two pairs of projecting flange portions;

FIGURES 4 and 6 are plan views of FIGURES 3 and 5, respectively;

Figure 7:
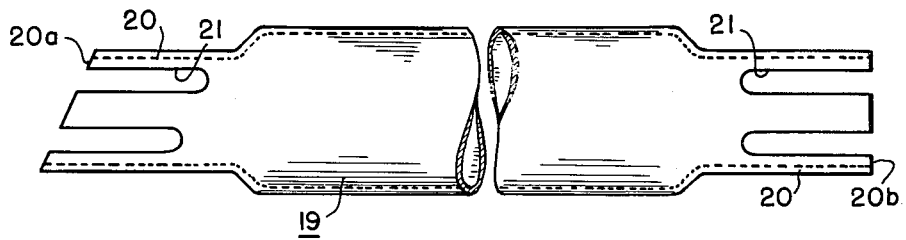
FIGURE 7 is a longitudinal side view illustrating a connecting member or brace having squared end portions for cooperative engagement with the projecting portions of our connecting T's; and, FIGURE 8 illustrates how a connecting member, such as shown in FIGURE 7, may be assembled with and secured to exemplary forms of the disclosed connectors.

Referring now to the drawings, and particularly FIGURE 1, an elongated extruded member 10 of a suitable metal, such as aluminum, is shown having a cylindrical or sleeve portion 11 and a pair of parallel side flanges, wings, prongs or projection portions 12. The side of the cylindrical portion 11 from which the flange portions 12 project is provided with a thickened shoulder portion 13 defining an outer planar face or surface 14. The projections 12 are substantially normal to the planar surface 14 and project outwardly with a gradual decreasing thickness from the planar surface 14.

The extrusion-formed, longitudinally-extending member 10 may be cut, as along lines a, b, c and d of FIGURE 1, into segments of desired lengths, such as A, B, C and D (FIGURE 2). The parallel flange or projection portions 12 are then cut to form prongs, such as 15, 15a, 15b and 15c of a desired configuration and location. As illustrated in section A of FIGURE 2, the prongs 15 are formed adjacent one end of the longitudinal extent of the section and have parallel, opposed narrow sides or edges 16 and 18 formed perpendicular to the planar surface 14 to provide a 90 degree T which is endwise offset with respect to the longitudinal extent of the T. In section B of FIGURE 2, prongs 15a are positioned centrally of the longitudinal length of the section and have parallel, opposed narrow sides or edges 16a and 18a that project from the planar surface 14 to form a 90 degree T having its prongs formed centrally thereon. It will be noted that the prongs taper or converge from their inner towards their outer end portions along their opposite wide side faces or surface portions. As will be noted, the prongs 15 are substantially of a rectangular parallelepiped shape.

Section C of FIGURE 2 is provided with prongs 15b having parallel, opposed narrow sides or edges 16b and 18b which are angularly inclined to the planar surface 14. The end edge 17b of the inclined side 16b is normal to the planar surface 14 and lies in the plane of the end face 17 of the section, such as is formed by the cut b. It thus can be seen that although one inclined surface or edge 16b of the prongs 15b has a portion 17b normal to the planar surface 14, the inclined surfaces or edges 16b and 18b provide an angular T connection. The angle of inclination of the surfaces 16b and 18b may be varied between 0 and 90 degrees, as desired.

Projections 15c formed on section D have inclined narrow side surfaces or edges 16c and 18c projecting outwardly from the planar surface 14. However, since the section D is of sufficient length and the angle of inclination of the surfaces 16c and 18c with planar surface 14 is fairly steep, the inclined surfaces or edges 16c do not intersect the plane of the end face 17 of the cylindrical section and therefore, the end faces 16c do not have a portion perpendicular to the planar surface 14, as do the inclined surfaces 16b of section C. The inclination of the surfaces 16c and 18c may be varied to provide an angular T of any desired angular relation. As shown in section D, the prongs 15c are of a parallelepiped configuration with opposed rhomboid side faces.

The longitudinal extruded member 10 may be formed with a plurality of pairs of parallel flanges or projections 12 arcuately positioned about the cylindrical portion 11. The T's, having a plurality of parallel flange portions, are formed in the same manner as those illustrated in FIGURE 2. Although the number of parallel flange portions and the angular relationship therebetween may be varied as desired to form T connectors of virtually any desired configuration, FIGURES 3 through 6 represent common forms of multiple parallel flange type connectors. FIGURES 3 and 4 illustrate a 90 degree T having prongs with edges perpendicular to the planar surface similar to that shown in sections A and B of FIGURE 2, but having two sets or pairs of prongs positioned 90 degrees apart. Like numerals having prime suffixes in FIGURES 3 and 4 illustrate like parts of section B of FIGURE 2. It will be noted, however, that the cylinder 11' of the extruded member 10' has two thickened shoulder portions 13', each of which has a planar surface 14'. Each surface 14' has outwardly-extending projections 15a' having narrow side or edge surfaces or faces 16a' which are normal to the planar surface 14'.

FIGURES 5 and 6 illustrate a 45 degree corner T having two sets of parallel prongs positioned at 90 degrees about the cylindrical portion of the T. The numerals of FIGURES 5 and 6 having prime suffixes represent like parts illustrated in section C of FIGURE 2. The cylindrical portion 11' of the extruded member 10'' has a pair of thickened shoulder portions 13', each of which has a planar surface 14'. Each planar surface 14' is provided with a pair of prongs 15b' having an angularly-inclined narrow side or edge surface 16b' terminating in a surface portion 17b' that lies normal to the planar surface 14' and in the plane of the end surface 17' of the cylindrical portion 11' (note particularly FIGURE 5).

The various forms of the prongs are adapted to be engaged by a brace or tubular member, such as illustrated at 19 in FIGURE 7. Each brace or tubular member is provided with specially formed or crimped end portions 20 having a rectangular and preferably, a square cross-section transverse to the longitudinal axis of the member. The end face of the cross section may be slanted or inclined to the longitudinal axis of the tube, as shown at 20a, or may be perpendicular or vertical to the axis, as shown at 20b. The sides of the squared end portion 20 are provided with fillet weld pockets 21 adapted to provide fillet weld connections between the end portions 20 and the prongs of the various extruded connectors.

Figure 8:
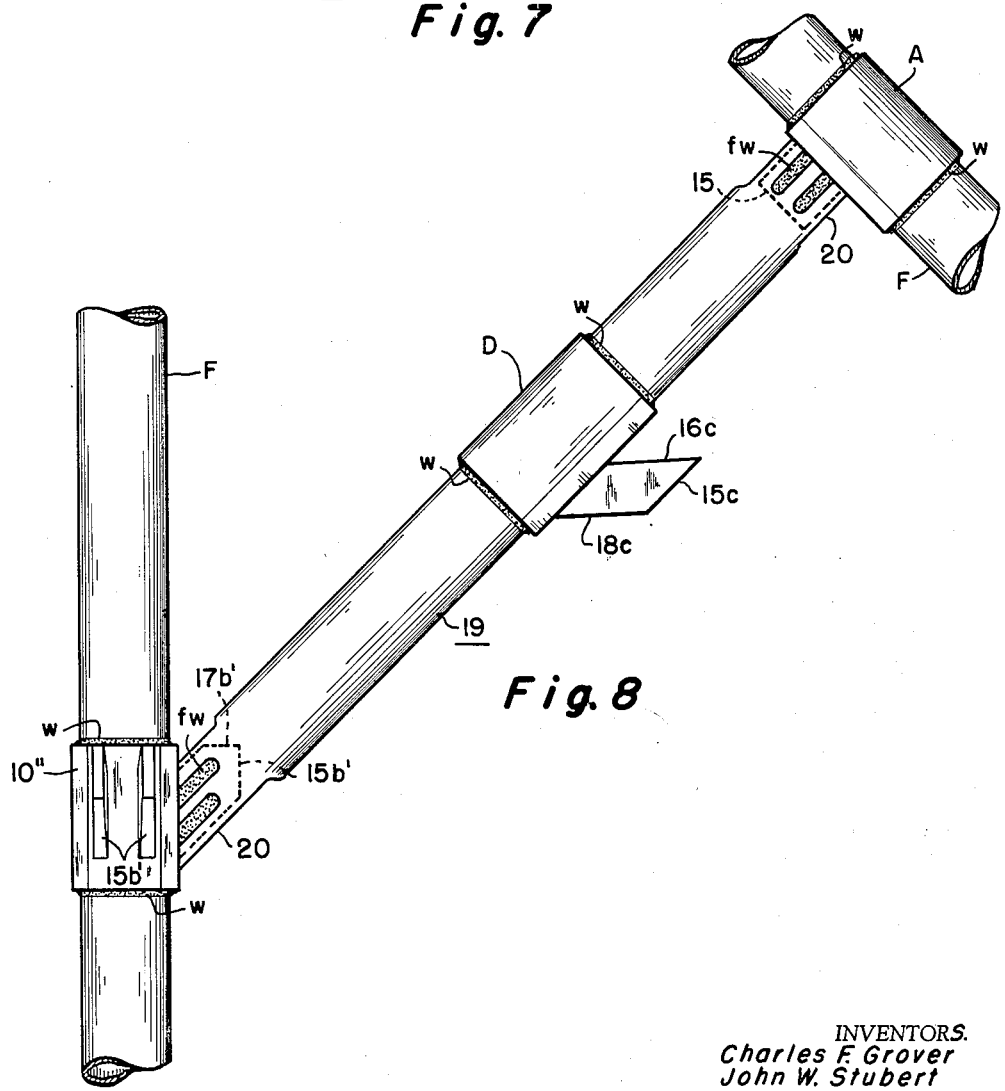

FIGURE 8 is a side view illustrating how various connectors mounted on a scaffolding framework may be connected together by the squared ended tubing. Connector 10'', illustrated in FIGURES 5 and 6, is shown mounted on a tubular scaffolding frame member F, such as an end frame. The connector A of FIGURE 2 is shown mounted on another tubular scaffolding frame member F, such as a diagonal or brace member. A connecting member 19 having a slanting or inclined end face 20a is shown secured to the prongs 15b' of a connector 10'' by means of a fillet weld fw. The opposite squared end 20 of the tube 19 is shown provided with a perpendicular end face 20b and is secured to prongs 15 of a connector A by means of a fillet weld fw in each of the weld pockets 21. The connectors 10'' and A may be connected to their respective scaffolding frames F by means of welds w, or they may be cemented in place or left free to slide or rotate thereon. A connector illustrated by section D of FIGURE 2 is shown positioned on the tubular member 19 intermediate its ends. Preferably, the connector D is positioned on the tube 19 before the square ends 20 are formed. The connector D may be welded in place on the member 19 or it may be allowed to slide or rotate thereon. Another brace or tubular member (not shown) may be operatively connected to the prongs 15c of the connector D.

The connectors thus formed in accordance with our invention may be held to close structural tolerances, but are inexpensive to manufacture. A longitudinally-extending member having the desired number and orientation of pairs of projecting flanges is extruded of suitable material, such as wrought aluminum or aluminum alloy. The longitudinally-extending extruded member is then cut transversely into segments of desired lengths. The segments are formed into connectors by cutting the flange portions into projections of desired configuration. The connector thus-formed is positioned over a scaffolding frame member and, depending on its desired usage, may be either allowed to slidably rotate thereon or may be rigidly secured in position by welding or cementing. A tubular member having a squared end is then positioned over the projections formed on the connector and welded thereto, preferably by means of a fillet weld, thus providing a strong, rigid connection. The fillet weld is especially adapted to the use of wrought aluminum connectors, due to its ease of welding.

Although we have illustrated several embodiments of our invention, it is to be understood that various changes and modifications may be made thereto, without departing from the spirit and scope of the invention as embodied in the accompanying claims.

What we claim is:

1. A connecting T for use with scaffolding constructions comprising, a longitudinally-extending hollow cylindrical portion, at least one longitudinally-extending planar surface portion formed on an outer side surface of said cylindrical portion, a pair of prongs projecting outwardly from said planar surface portion, said prongs being formed integrally with said cylindrical portion and wedgably tapering from a thicker portion adjacent said planar surface portion to a thinner portion adjacent their outer ends.

2. An improved connecting T for use in scaffolding constructions comprising, a cylindrical body portion, said body portion having a plurality of arcuately spaced-apart outer planar surface portions defining stop abutment portions, a pair of outwardly-projecting prong means formed integral with and projecting substantially normal from each of said planar surface portions, and each of said prong means having inclined side edges which taper outwardly from the planar surface portions to form wedge-shaped T connector prongs.

3. In scaffolding assembly having a plurality of connected frame members, an improved T connection comprising a cylindrical body portion adapted to be mounted about a frame member of the scaffolding apparatus, said cylindrical body portion having at least one planar face portion formed on its outer surface, at least one pair of prongs formed integrally with and projecting outwardly from each such planar face portion; and a tubular member having at least one end portion defining a rectangular cross-section that wedgably circumscribes and is operatively mounted over and about a pair of said prongs.

4. In scaffolding assembly having a plurality of connected frame members, an improved connecting means for connecting such members comprising, a T connector having a longitudinally-extending cylindrical portion, at least one planar surface portion formed on the outer face of said cylindrical portion, a pair of tapered substantially parallel prongs formed integral with and extending substantially normal from each said planar surface portion, a connecting member having at least one squared end portion circumscribing and operatively mounted about said pair of said prongs in abutting contact with said planar surface portions, said squared end portion having fillet weld pockets formed in side walls thereof to lie adjacent said prongs, and said tubular member being fillet-welded to said prongs.

5. A T connector for use in a scaffolding construction comprising, a longtudinally-extending cylindrical sleeve portion having at least one substantially planar side surface portion forming an abutment shoulder extending longitudinally thereof, at least one pair of substantially parallel prongs extending substantially parallel to the longitudinal axis of said cylindrical portion and formed integral with and extending normal to said planar surface portion, and the internal surface of said cylindrical portion and side surfaces of said substantially parallel prongs being smooth-flowing, continuous and uninterrupted.

6. A T connector as defined in claim 1 for use with a crimped-end tubular member of the scaffolding construction, wherein each of said prongs is of a substantially rectangular parallelepiped shape for connecting the crimped-end tubular member to the T connector with the longitudinal axis of the tubular member positioned perpendicular to the longitudinal axis of said longitudinally-extending hollow cylindrical portion.

7. A T connector as defined in claim 4 for use with a crimped-end tubular member of the scaffolding construction, wherein each of said prongs is parallelepiped-shaped and has opposed rhomboid-shaped longitudinally-extending side surfaces to connect the crimped-end tubular member to the T connector with the longitudinal axis of the tubular member intersecting the longitudinal axis of said cylindrical portion at an acute angle.

References Cited in the file of this patent

UNITED STATES PATENTS

| | | |
|---|---|---|
| D. 174,951 | Fishberg | June 14, 1955 |
| 415,065 | Rung | Nov. 12, 1889 |
| 566,364 | Wilson | Aug. 25, 1896 |
| 1,328,509 | Ganster | Jan. 20, 1920 |
| 1,582,587 | Dunlap | Apr. 27, 1926 |
| 2,004,138 | Story et al. | June 11, 1935 |
| 2,212,912 | Booth | Aug. 27, 1940 |
| 2,347,957 | McCullough | May 2, 1944 |
| 2,487,169 | Newell | Nov. 8, 1949 |

FOREIGN PATENTS

| | | |
|---|---|---|
| 972,215 | France | Aug. 23, 1950 |

UNITED STATES PATENT OFFICE
CERTIFICATE OF CORRECTION

Patent No. 2,990,203 June 27, 1961

Charles F. Grover et al.

It is hereby certified that error appears in the above numbered patent requiring correction and that the said Letters Patent should read as corrected below.

Column 5, line 7, for the claim reference numeral "4" read -- 1 --.

Signed and sealed this 14th day of November 1961.

(SEAL)
Attest:

ERNEST W. SWIDER
Attesting Officer

DAVID L. LADD
Commissioner of Patents

USCOMM-DC